United States Patent [19]

Woodbrey et al.

[11] 4,320,213

[45] Mar. 16, 1982

[54] HIGH-IMPACT POLYAMIDE MOLDING RESIN COMPOSITIONS

[75] Inventors: James C. Woodbrey, Chesterfield, Mo.; Marlowe V. Moncur, Pensacola, Fla.

[73] Assignee: Monsanto Company, St. Louis, Mo.

[21] Appl. No.: 84,441

[22] Filed: Oct. 24, 1979

Related U.S. Application Data

[63] Continuation-in-part of Ser. No. 956,480, Oct. 30, 1978, abandoned.

[51] Int. Cl.³ ............................................. C08L 77/00
[52] U.S. Cl. .................................... 525/179; 525/66; 525/183; 525/184
[58] Field of Search .................. 260/857 UN, 857 L; 525/183, 184, 66, 179

[56] References Cited

U.S. PATENT DOCUMENTS

| | | | |
|---|---|---|---|
| Re. 23,514 | 8/1952 | Vorn | 260/45.5 |
| 2,557,808 | 6/1951 | Walker | 260/857 UN |
| 3,236,914 | 2/1966 | Murdock | 260/857 |
| 3,313,789 | 4/1967 | Naarmann | 260/857 L |
| 3,336,267 | 8/1967 | Zimmerman | 260/78.5 |
| 3,373,223 | 5/1968 | Armstrong | 260/857 L |
| 3,472,916 | 10/1969 | Anspon | 260/857 L |
| 3,520,949 | 7/1970 | Shepherd | 260/857 UN |
| 3,546,319 | 12/1970 | Prevorsek | 260/857 |
| 3,548,028 | 12/1970 | Itabashi et al. | 260/857 L |
| 3,673,277 | 6/1972 | Schmitt | 260/857 L |
| 3,947,528 | 3/1976 | Wingler | 260/857 UN |
| 3,966,839 | 6/1976 | Sims | 260/857 UN |
| 3,966,839 | 6/1976 | Sims | 260/857 UN |
| 3,984,497 | 10/1976 | Owens | 260/879 |
| 4,038,342 | 7/1977 | Schwartz | 260/862 |
| 4,100,223 | 7/1978 | Meyer | 260/857 L |
| 4,174,358 | 11/1979 | Epstein | 525/183 |

FOREIGN PATENT DOCUMENTS

| | | |
|---|---|---|
| 1231013 | 12/1966 | Fed. Rep. of Germany . |
| 2722270 | 1/1977 | Fed. Rep. of Germany . |
| 45-31953 | 10/1970 | Japan ................... 526/272 |
| 51-143061 | 12/1976 | Japan . |
| 1241361 | 8/1971 | United Kingdom ........... 260/857 L |
| 1440030 | 6/1976 | United Kingdom ........ 260/857 UN |

*Primary Examiner*—Paul Lieberman
*Attorney, Agent, or Firm*—P. D. Matukaitis; E. P. Grattan; S. M. Tarter

[57] ABSTRACT

Polyamide molding resin compositions are prepared by melt-blending a polyamide resin, a hydroxyl-functional elastomer and a succinic-functional coupling agent. The invention includes a process fore preparing the molding resin and the molded resin product.

26 Claims, No Drawings

HIGH-IMPACT POLYAMIDE MOLDING RESIN COMPOSITIONS

CROSS-REFERENCE TO RELATED APPLICATIONS

This is a continuation-in-part of copending application Ser. No. 956,480 filed Oct. 30, 1978 now abandoned.

BACKGROUND OF THE INVENTION

1. Field of the Invention

The invention is polyamide-based molding resin with high impact resistance, the process for its preparation, and the molded resin product.

2. The Prior Art

Polyamide resins have long been known for their excellent toughness, flexibility, abrasion resistance and relatively high impact strength. Molded or extruded polyamides have found application in appliances, consumer products, electronics, machine components, automotive parts, gears, and like uses.

While the impact strength of polyamide resins is relatively high among molding resins, it is insufficient for use where extremely high impact strength is required, as in collision-vulnerable automotive body parts. Compared to steel, for example, even polyamide molding resins, modified as so far known in the prior art, fall far short of the necessary impact resistance to provide a meaningful entry into markets requiring such high impact strength.

Past efforts to modify properties of polyamide resins have included the forming of blends with other resinous materials which in themselves have certain desirable properties not inherent in the polyamides, and without sacrificing to any great extent the inherent physical properties of the polyamide. For example, among the attempts to improve impact strength were the blending of polyamides with graft or random copolymers of monoolefins and unsaturated carboxylic acids or acid esters, as disclosed in U.S. Pat. Nos. 3,236,914 and 3,472,916; and by forming blends of a polyamide, a polyolefin and an olefin-carboxylic acid copolymer as disclosed in U.S. Pat. No. 3,373,223. Some improvement in impact strength was obtained as described in U.S. Pat. No. 3,984,497 through the use of an alkyl acrylate elastomer with a polyamide. Some tear resistance has been added to polyamides, as taught in U.S. Pat. No. 3,546,319, by the use of up to 15% of an elastomer. None of these modifications of polyamides, either alone or in combination, have provided the high degree of impact resistance necessary to withstand impacts typical of minor automotive accidents.

Succinic anhydride functionality (as taught in U.S. Pat. No. 4,010,223) has been incorporated in elastomeric copolymers of ethylene, at least one non-conjugated diene and at least one $C_3-C_6$ α-olefin (EPDM). An improvement in impact resistance has been obtained by using certain anhydride or succinic-functional polymers and elastomers to modify polyamides as is taught in NL No. 7,605,485.

To obtain improved impact resistance in a polyamide molding resin without a substantial sacrifice of other desirable properties of the resin with compositions not taught in the prior art would be a significant advance in the art and is an object of this invention.

SUMMARY OF THE INVENTION

The invention is a polyamide molding resin suitable for molding into high impact resistant forms comprising the product of melt-blending from about 50 percent to about 97 percent by weight of a polyamide resin, from about 3 percent to about 50 percent by weight of a hydroxylfunctional elastomer and an effective amount of a succinicfunctional coupling agent. The invention also includes the composition suitable for such melt-blending and the process of melt-blending.

The molding resin is prepared by melt-blending from about 50 percent to about 97 percent by weight of a polyamide resin, from about 3 percent to about 50 percent by weight of a hydroxyl-functional elastomer, and an effective amount of a succinic-functional coupling agent. The blend is subjected to heat and shear in order to disperse the elastomer and cause a coupling reaction between the polyamide resin and the elastomer through the succinic-functional coupling agent.

The molded product of the molding resin described above is also claimed as an aspect of this invention. These molded resin products have surprisingly high impact resistance.

DETAILED DESCRIPTION OF THE PREFERRED EMBODIMENT

As used herein the term "polyamide resins" includes all polymers having recurring carbonamide groups in the main chain, and having molecular weights greater than 2000. "Molecular weight", as used herein, refers to number average molecular weight for polyamides (See Flory "Principals of Polymer Chemistry", Page 273, published 1953, by Cornell University Press).

The polyamide resin in ordinarily produced by condensation of equimolar amounts of a dicarboxylic acid or acid derivative containing from two to twenty carbon atoms with a diamine, containing from two to fifteen carbon atoms, or by lactam polymerization according to well known techniques. Preferred polyamides are those based on lactams and those based on aliphatic diamines condensed with aliphatic or aromatic diacids. Included in this group are polyhexamethylene adipamide (nylon 6,6), polycaprolactam (nylon 6), polyhexamethylene sebacamide (nylon 6,10), polyhexamethylene isophthalamide (nylon 6IA), polyhexamethylene tereco-isophthalamide (nylon 6TA/IA), and mixtures or copolymers thereof.

By "hydroxyl-functional elastomer" is meant any elastomer having at least 5 mole equivalents of hydroxyl groups per $10^6$ grams of polymer. These elastomers are characterized by glass transition temperatures below 0° C. Preferred are elastomers having glass transition temperatures below $-20°$ C. and 10–500 mole equivalents of hydroxyl groups per $10^6$ grams of polymer. These hydroxyl groups may be primary or secondary.

Elastomers with little or no unsaturation in the main chain are preferred because saturated elastomers have higher thermal and oxidative stability. Known substantially saturated elastomers include poly(ethylene/propylene) (EPR), poly(ethylene/propylene/diene) (EPDM, with typical dienes being non-conjugated and having from about 6 to about 20 carbons), polyacrylates, poly(ethylene/acrylates), poly(propylene/acrylates), polyisobutylenes (butyls), and poly (ethylene/vinyl acetate) (EVA).

Hydroxyl functionality may be incorporated into the elastomers by any one of several techniques well known in the art. These include:

(a) Copolymerization of an elastomer monomer with a hydroxyl-functional monomer, such as 2-hydroxyethyl acrylate or allyl alcohol copolymerized with ethyl or butyl acrylate;

(b) Grafting of an elastomer with pendant unsaturation, such as EPDM, with a hydroxyl-functional monomer, such as 2-hydroxyethyl acrylate;

(c) Hydrolysis or partial hydrolysis of an elastomer with pendant acetate groups, such as EVA;

(d) Modification of an ester-functional elastomer, such as a polyacrylate or poly(ethylene/acrylate), by ester-interchange with a diol, such as ethylene glycol;

(e) Esterification of a carboxyl-functional elastomer, such as an ethylene/propylene/acrylic acid terpolymer, with a diol; or (f) Oxidation of an elastomer with pendant unsaturation, such as EPDM, to 1,2-diol.

Known preferred hydroxyl-functional elastomers include polyacrylates and poly(ethylene/acrylates), which are based on alkyl acrylates with 1–15 carbon atoms in the alkyl group. The hydroxyl group is conveniently introduced by copolymerization of a hydroxyl-functional monomer with alkyl acrylate monomers. Preferred hydroxyl-functional monomers are 2-hydroxyethyl acrylate, 2-hydroxypropyl acrylate and the corresponding methacrylates, and allyl alcohol. In addition to ethylene units, the acrylate elastomers may contain minor amounts of non-acrylic units, such as other vinyl units.

Acrylic elastomers may be synthesized by any radical polymerization process, all well known in the art, including emulsion, suspension, solution, or mass polymerization. Emulsion or suspension polymerization is preferred for all-acrylic elastomers.

Emulsion polymerization is conducted in accordance with known techniques with the use of conventional materials, including, for example, free-radical initiators, soaps and emulsifiers, modifiers of numerous types, and the like.

The polymerization reactions can be initiated by either thermal or redox-type initiator systems. Examples of thermal initiators include the organic peroxides, such as benzoyl peroxide, substituted benzoyl peroxides, acetyl peroxide, lauryl peroxide, t-butyl hydroperoxide, di-t-butyl peroxide; peresters, such as t-butyl peroxypivalate; azo-type initiators, such as azo-bis-isobutyronitrile; persulfates, such as sodium, potassium, or ammonium persulfate; and peroxyphosphates, such as sodium, potassium, or ammonium peroxyphosphate. Redox initiators include, for example, a combination of a hydroperoxide, such as hydrogen peroxide, t-butyl hydroperoxide, cumene hydroperoxide, diisopropyl benzene hydroperoxide, and the like, and a reducing agent, such as sodium, potassium or ammonium bisulfite, metabisulfite or hydrosulfite, sulfur dioxide, hydrazine, ferrous salts, isoascorbic acid, sodium formaldehyde sulfoxalate, and the like.

Examples of emulsifiers or soaps suited to the polymerization processes just described include alkali metal and ammonium salts of alkyl, aryl, alkaryl, and aralkyl sulfonates, sulfates and polyether sulfates, fatty acids, ethoxylated fatty acids, esters, alcohols, amines, amides, alkyl phenols, complex organo-phosphoric acids and their alkali metals and ammonium salts.

Chain transfer agents, including mercaptans, polymercaptans, and polyhalogen compounds are often desirable in the polymerization mix.

By "succinic-functional coupling agent" is meant any compound or polymer containing an average of two or more succinic anhydride, succinic diacid or succinic monoester (typically $C_1$–$C_8$ ester) groups per molecule. Examples of such coupling agents include styrene/maleic anhydride copolymers; ethylene/maleic anhydride copolymers; vinyl acetate/maleic anhydride copolymers; isobutylene/maleic anhydride copolymers; 1-alkene/maleic anhydride copolymers; other copolymers of vinyl monomers with maleic anhydride, itaconic anhydride, citraconic anhydride, cyclohex-4-ene-1,2-dicarboxylic anhydride, 5-norbornene-2,3-dicarboxylic acid anhydride, chloromaleic anhydride or dichloromaleic anhydride; and the corresponding diacids and monoester derivatives thereof. Preferred are the styrene/maleic anhydride copolymers (SMAs) having low number average molecular weight (less than 5000) and an average anhydride content of 2–7 anhydride groups per molecule. "SMA" copolymers include those copolymers in which some of the anhydride groups have been hydrolyzed, esterified by reaction with one or more alcohols, or amidized or imidized by reaction with one or more amines. Also included are polymers made from styrene, maleic anhydride and other vinyl monomers.

The melt-blending may incorporate essentially non-reactive, or non-interferring additives, colorants, or reinforcing materials which may be desired to add or enhance existing properties or characteristics. Such materials may be included in the essential components to be melt-blended. Particularly desirable in impact-resistant type molding resins may be reinforcing materials, such as glass, metal, mica, silica, and the like. A heat stabilizer such as copper acetate and potassium iodide in combination may be desirable particularly where the molded products may be exposed to high temperatures. Anti-oxidants such as organic phosphites and/or hindered phenols may also be desirable. Such stabilizers and antioxidants are well known in the art.

The modified polyamide resin may be prepared by melt-blending from about 50 percent to about 97 percent by weight (from about 70 percent to about 95 percent preferred) of the polyamide, from about 3 percent to about 50 percent by weight (from about 5 percent to about 30 percent preferred) of the hydroxyl-functional elastomer and an effective amount of the succinic-functional coupling agent.

It is to be understood that in the specification and claims herein, unless otherwise indicated, when in connection with melt-blending, the amount of the polyamide, hydroxyl-functional elastomer or succinic-functional coupling agent is expressed in terms of percent by weight it is meant percent by weight based on the total amount of these three materials which is employed in the melt-blending.

During the melt-blending, a coupling reaction takes place between the polyamide and the elastomeric component. While the following theory should not be held as delimiting, it is hypothesized that the coupling agent reacts with both the amine end groups of the polyamide and the hydroxyl groups of the elastomeric component to effect the coupling.

The term "effective amount" when used herein in connection with the succinic-functional coupling agent means an amount which is effective to couple the polyamide and hydroxyl-functional elastomer when melt-blended therewith, to form a composition having greater impact strength than the polyamide alone and the polyamide plus the elastomer.

Generally, the amount of coupling agent melt-blended will be from about 0.1 percent to about 10 percent by weight, preferably from about 0.5 to about 3 percent. Within these percent ranges, the optimum or allowable working level of coupling agent may vary somewhat depending upon its succinic-functional group content, the amine content of the polyamide and the hydroxyl content of the elastomer. Where the succinic group content, and/or where the hydroxyl content of the elastomer, and/or the amine content of the nylon is very low, the maximum workable amount of the coupling agent may be reduced to as little as about 2%. A precise factorial analysis has not yet been developed.

The blending and reaction of the three components may be accomplished with a single-screw extruder, a twin-screw extruder, or any high-shear commercial grade plastic compounding equipment. The melt-blending may be accomplished in one or more stages. In a single stage melt-blending process, the three components are blended simultaneously. Alternately the polyamide and elastomeric components may be blended initially followed by a blending of the resulting blend with the succinic-functional coupling agent. Alternately, the elastomeric component and the succinic-functional coupling agent may be first blended, followed by blending of the resulting blend with the polyamide component. If desirable, the polyamide component may be split into two portions, each initially blended with one of the two remaining components, with a subsequent blending of each of the polyamide blends.

To assist those skilled in the art in the practice of this invention, the following modes of operation are set forth as illustrations, parts and percentages being by weight unless otherwise specifically noted.

EXAMPLE 1

(preparation of a hydroxyl-functional acrylic elastomer by mass polymerization)

3.325 kg of butyl acrylate, 175 grams of 2-hydroxyethyl methacrylate and 3.5 grams of azo-bis-isobutyronitrile (AIBN) were mixed and stirred at room temperature until a homogeneous, single-phase solution was attained. The solution was de-oxygenated by bubbling dry nitrogen gas through it, and then cast into a 6.35 mm thick cavity of a vertical press having platens which were preheated and coated with a fluorocarbon-type anti-adhesion compound having the trade name "Teflon".

The solution was polymerized under a dry nitrogen gas blanket for 24 hours at 50° C., then for 50 hours at 65° C. After cooling to room temperature, the resulting product was a clear, tacky elastomer sheet.

EXAMPLE 2

(two-stage blending of nylon, hyroxyl-functional elastomer and SMA coupling agent)

A. 2.8 kg of nylon 66 having a number average molecular weight ($M_n$) of about 12,000 and 0.7 kg of small cubes of the elastomer produced in Example 1 were dry-blended and then melt-blended via extrusion through a 3.81 cm single-screw extruder with barrel and die-temperatures of 280° C. The extruder was equipped with a mixing screw and choke valve. The choke valve was adjusted to maintain maximum back pressure up to 21–24 MPa during extrusion in order to enhance the level of shear. The mixture was extruded four times.

B. 3 kg of this pelletized blend containing 20% elastomer and 60 grams of SMA-3000A (a styrene/maleic anhydride copolymer with $M_n=1900$ and acid number=270 produced by Arco Chemical Company) were dry-blended and then melt-blended by extrusion as described above (3 passes). The pelletized blend was then injection molded into 3.175 mm×12.7 mm×12.7 cm bars with a commercial reciprocating screw injection molding machine. The bars were kept dry in sealed polyethylene bags and conditioned at room temperature for 24 hours before testing. Notched Izod impact strength was 742 J/m notch.

A control sample of the same nylon 66 was injection molded and tested in the same manner as above. The Izod impact strength was 59 J/m notch.

A second control sample was prepared by extrusion compounding (7 passes) of a blend of 2.4 kg of nylon 66 and 0.6 kg of the elastomer produced in Example 1. Izod impact strength was 164 J/m notch. Izod impact strength was measured in accordance with ASTM D256-73.

EXAMPLE 3

2.4 kg of nylon 66 and 0.6 kg of the elastomer produced in Example 1 were dry-blended and then melt-blended as described in Example 2A. 2.485 kg of this pelletized blend and 25 grams of SMA-3000A were dry-blended and then melt-blended and molded as described in Example 2B. Izod impact strength was 517 J/m notch.

EXAMPLE 4

2.4 kg of nylon 66 and 0.6 kg of the elastomer produced in Example 1 were dry-blended and then extrusion compounded as described in Example 2A. 2.94 kg of this pelletized blend and 88.2 grams of SMA-3000A were then melt-blended and molded as described in Example 2B. Izod impact strength was 202 J/m notch.

EXAMPLE 5

A hydroxyl-functional acrylic elastomer was prepared as described in Example 1 from mass polymerization of 3.465 kg of butyl acrylate, 35 grams of 2-hydroxyethyl methacrylate and 5 grams of AIBN. The polymerization was carried out at 50° C. for 16 hours followed by 8 hours at 80° C. The product was a clear, tacky elastomer sheet.

EXAMPLE 6

2.4 kg of nylon 66 and 0.6 kg of the elastomer produced in Example 5 were dry-blended and then extrusion compounded as described in Example 2A, except only 3 passes were used. The melt strength of the blend decreased with each pass and was too low to extrude a fourth pass. This material could not be molded. 2.7 kg of this pelletized blend and 27 grams of SMA-3000A were dry-blended and then melt-blended (3 passes) and molded as described in Example 2B. Izod impact strength was 165 J/m notch.

EXAMPLE 7

(alternate two-stage blending process)

50 grams of the elastomer produced in Example 5 and 2.5 grams of SMA-3000A were compounded using a Brabender Plasti-corder equipped with a mixer head attachment. Compounding was conducted at 200° C. and 160 rpm for 15 minutes.

475 grams of this compounded elastomer-SMA blend (from 10 duplicate batches) and 1.9 kg of nylon 66 were dry-blended and then melt-blended by extrusion (2 passes) and molded as described in Example 2B. Izod impact strength was 759 J/m notch.

EXAMPLE 8

(comparative)

45 grams of the elastomer produced in Example 5 and 5.85 grams of SMA-3000A were compounded using a brabnder Plastic-corder equipped with a mixer head attachment. Compounding was conducted at 200° C. and 160 rpm for 10 minutes.

475 grams of this elastomer-SMA blend (from 10 duplicate batches) and 1.9 kg of nylon 66 were dry-blended and then melt-blended by extrusion as described in Example 2A. The melt viscosity of the blend was very high and the extruded strand was rough, even after the third pass, indicating the SMA level was too high for this particular elastomer-coupling agent combination. This blend was not molded for testing.

EXAMPLE 9

(elastomer preparation)

A hydroxyl-functional elastomer was prepared as described in Example 1 from mass polymerization of 2 kg of butyl acrylate, 450 grams of ethyl acrylate, 50 grams of 2-hydroxyethyl acrylate and 2.5 grams of AIBN. Polymerization was carried out at 50° C. for 48 hours followed by 80° C. for 15 hours. The product was a clear, slightly tacky elastomer sheet.

EXAMPLE 10

A. 7.6 kg of nylon 66, 1.9 kg of the elastomer produced in Example 9 and cupric acetate/potassium iodide stabilizer in the amount 2.9g/29g were dry-blended and then compounded by extrusion as described in Example 2A (4 passes).

B. 3 kg of the pelletized blend produced in Example 10A and 30 grams of SMA-3000A were dry-blended and then compounded by extrusion (3 passes) and molded as described in Example 2B. Izod impact strength was 639 J/m notch.

A control sample was prepared by compounding a blend of 2 kg of nylon 66, 0.5 kg of the elastomer produced in Example 9 and 0.75/7.5 grams of cupric acetate/potassium iodide stabilizer (7 passes), and molding as described in Example 2. Izod impact strength was 88 J/m notch.

EXAMPLE 11

3 kg of the blend produced in Example 10A and 60 grams of SMA-3000A were dry-blended and compounded by extrusion (3 passes) and molded as described in Example 2B. Izod impact strength was 363 J/m notch.

EXAMPLE 12

3 kg of the blend produced in Example 10A and 15 grams of SMA-3000A were dry-blended and then compounded by extrusion (3 passes) and molded as described in Example 2B. Izod impact strength was 210 J/m notch.

EXAMPLE 13

2.7 kg of nylon 66 and 0.9 kg of the elastomer produced in Example 9 were compounded as described in Example 2A (4 passes). 3.2 kg of this pelletized blend and 32 grams of SMA-3000A were then compounded (2 passes) and molded as described in Example 2B. Izod impact strength was 815 J/m notch.

EXAMPLE 14

2.8 kg of a nylon 66/6 random copolymer containing 10 weight % nylon 6 and 0.7 kg of the elastomer produced in Example 9 were compounded as described in Example 2A (4 passes). 2.95 kg of this pelletized blend and 29.5 grams of SMB-3000A were dry-blended and compounded (3 passes) and molded as described in Example 2B. Izod impact strength was 830 J/m notch.

EXAMPLE 15

A. 2.4 kg of a 40/60 poly(hexamethylene tere-co-isophthalamide) (nylon 6TA/IA) random copolymer and 0.8 kg of the elastomer produced in Example 9 were compounded as described in Example 2A (4 passes, 295° C.). A sample of this blend was molded as a control as described in Example 2B. Izod impact strength was 128 J/m notch.

B. 1.2 kg of the pelletized blend produced in Example 15A and 12 grams of SMA-3000A were dry-blended and then compounded (4 passes, 295° C.) and molded as described in Example 2B. Izod impact strength was 279 J/m notch.

A control sample of the same nylon 6TA/IA was molded using the same conditions as above. Izod impact strength was 104 J/m notch.

EXAMPLE 16

(Suspension polymerization of hydroxyl-functional acrylic elastomer)

A solutions of 5 grams NaCl, 0.8 grams of a poly(acrylic acid) suspending agent and 2.155 kg of water was prepared in a 5-liter 3-neck flask. The aqueous solution was heated to 70° C. and stirred under nitrogen. A monomer solution was prepared in a separate flask from 719 grams of butyl acrylate, 36 grams of 2-hydroxyethyl methacrylate and 1.6 grams of AIBN. The monomer solution was de-oxygenated by bubbling dry nitrogen gas through it and added to the aqueous solution. The mixture was stirred for 5 hours under nitrogen as the temperature was gradually increased from 70° to 85° C. After cooling to room temperature, the resulting elastomer beads were separated by filtration, washed with water and dried.

EXAMPLE 17

1.54 kg of nylon 66, 410 grams of the elastomer produced in Example 16 and 0.6/5.8 grams of cupric acetate/potassium iodide stabilizer were blended by extrusion as described in Example 2A (3 passes). 1.73 kg of this pelletized blend was then compounded with 34.6 grams SMA-3000A (3 passes) and molded as described in Example 2B. Izod impact strength was 630 J/m notch.

EXAMPLE 18

(elastomer preparation)

A hydroxyl-functional elastomer was prepared by suspension polymerization as described in Example 16 using an aqueous solution prepared from 5 grams of NaCl, 0.9 grams of poly(acrylic acid) suspending agent and 2.042 kg of water, and a monomer solution prepared from 812 grams of butyl acrylate, 43 grams of 2-hydroxyethyl methacrylate, 0.43 grams of 1,4-butanediol diacrylate and 3.8 grams of AIBN.

EXAMPLE 19

A. 2.4 kg of nylon 66, 0.6 kg of the elastomer produced in Example 18 and 0.9/9 grams of cupric acetate/potassium iodide stabilizer were compounded by extrusion as described in Example 2A (2 passes).

B. 2.75 kg of this pelletized blend and 82.5 grams of SMA-3000A were dry-blended and then compounded (3 passes) and molded as described in Example 2B. Izod impact strength was 170 J/m notch.

EXAMPLE 20

2.27 kg of the nylon 66/elastomer blend produced in Example 19A was compounded with 68.1 grams of SMA-3000A (3 passes) and molded as described in Example 2B. Izod impact strength was 123 J/m notch.

EXAMPLE 21

(Preparation of a hydroxyl-functional acrylic elastomer by emulsion polymerization)

A hydroxyl-functional acrylic elastomer was prepared by emulsion polymerization using seeding techniques to control particle size and the distribution of hydroxyl functionality within the particle. The surfactant was sodium lauryl sulfate and the initiator was potassium persulfate. Monomer and surfactant were added continuously over a 4 hour polymerization cycle at 55° C. Two monomer feeds were used; the first feed was a solution of 972 grams of butyl acrylate and 4.8 grams of 1,4-butanediol diacrylate. The second feed, added after completion of the first feed, was a solution of 17.5 grams of butyl acrylate and 17.5 grams of 2-hydroxyethyl acrylate. The resulting latex was coagulated by adding it to excess 50/50-methanol/water containing 2% NaCl. The coagulated crumb was then washed with methanol/water and dried.

EXAMPLE 22

A. 3.5 kg of nylon 66 and 875 grams of the elastomer produced in Example 21 were compounded as described in Example 2A (4passes).

B. 2.021 kg of the pelletized blend produced in Example 22A and 20.2 grams of SMA-3000A were dry-blended and then compounded (3 passes) and molded as described in Example 2B. Izod impact strength was 153 J/m notch.

EXAMPLE 23

2.021 kg of the nylon 66/elastomer blend produced in Example 22A and 30.3 grams of SMA-3000A were compounded (3 passes) and molded as described in Example 2B. Izod impact strength was 189 J/m notch.

EXAMPLE 24

An elastomer was prepared as described in Example 21 except the second monomer feed was a solution of 26.2 grams of butyl acrylate and 8.8 grams of 2-hydroxyethyl acrylate.

EXAMPLE 25

A. 3.1 kg of nylon 66 and 775 grams of the elastomer produced in Example 24 were compounded as described in Example 2A (4 passes).

B. 1.795 kg of the pelletized blend produced in Example 25A and 18 grams of SMA-3000A were compounded (3 passes) and molded as described in Example 2B. Izod impact strength was 172 J/m notch.

EXAMPLE 26

1.795 kg of the pelletized blend produced in Example 25A and 26.9 grams of SMA-3000A were compounded (3 passes) and molded as described in Example 2B. Izod impact strength was 229 J/m notch.

EXAMPLE 27

An elastomer was prepared as described in Example 21 except the second monomer feed was a solution of 8.8 grams of butyl acrylate and 26.2 grams of 2-hydroxyethyl acrylate.

EXAMPLE 28

A. 3.1 kg of nylon 66 and 775 grams of the elastomer produced in Example 27 were compounded as described in Example 2A (4 passes).

B. 1.783 kg of the pelletized blend produced in Example 28A and 17.8 grams of SMA-3000A were dry-blended and then compounded (3 passes) and molded as described in Example 2B. Izod impact strength was 99 J/m notch.

EXAMPLE 29

1.783 kg of the pelletized blend produced in Example 28A and 26.7 grams of SMA-3000A were dry-blended and then compounded (3 passes) and molded as described in Example 2B. Izod impact strength was 107 J/m notch.

EXAMPLE 30

400 grams of an ethylene/vinyl acetate/vinyl alcohol terpolymer containing 7.8% hydroxyl and 3.6 kg of nylon 66 were blended by extrusion (2 passes) as described in Example 2A. 3.6 kg of this pelletized blend and 78 grams of SMA-17352A (a modified styrene/maleic anhydride copolymer with $M_n = 1700$ and acid number = 270) were then compounded (3 passes) and molded as described in Example 2B. Izod impact strength was 128 J/m notch.

The foregoing embodiments are intended to illustrate but not to limit the invention. Various modifications can be made in the invention without departing from the spirit and scope.

What is claimed:

1. A composition comprising the product of melt-blending:
   (a) from about 50 percent to about 97 percent by weight of a polyamide resin;
   (b) from about 3 percent to about 50 percent by weight of a hydroxyl-functional elastomer containing at least 5 mole equivalents of hydroxyl groups per $10^6$ grams of elastomer; and (c) from about 0.1 percent to about 10 percent by weight of a succinic-functional coupling agent, wherein the coupling agent provides effective coupling of the elastomer to the polyamide.

2. A composition in accordance with claim 1 wherein the polyamide resin is selected from the group consisting of polyhexamethylene adipamide, polyhexamethylene sebacamide, polycaprolactam, polyhexamethylene isophthalamide, polyhexamethylene tere-co-isophthalamide and mixtures and copolymers of the above.

3. A composition in accordance with claim 1 wherein the elastomer is selected from the group consisting of hydroxyl-functional poly(ethylene/propylene), poly(ethylene/propylene/diene), polyacrylate, poly(ethylene/acrylate), poly(propylene/acrylate), polyisobutylene, poly(ethylene/vinyl acetate) elastomers, and mixtures of the above.

4. A composition in accordance with claim 1 wherein the succinic-functional coupling agent is selected from the group consisting of styrene/maleic anhydride copolymers, ethylene/maleic anhydride copolymers, vinyl acetate/maleic anhydride copolymers, vinyl ether/maleic anhydride copolymers, 1-alkene/maleic anhydride copolymers, and mixtures of the above.

5. A composition in accordance with claim 1 wherein the succinic-functional coupling agent is a styrene/maleic anhydride copolymer.

6. A composition in accordance with claim 1 wherein component (a) is from about 70 percent to about 95 percent by weight.

7. A composition in accordance with claim 1 wherein component (b) is from about 5 percent to about 30 percent by weight.

8. A composition in accordance with claim 1 wherein component (c) is from about 0.5 percent to about 3 percent by weight.

9. A composition comprising the product of melt-blending:
  (a) from about 70 percent to about 95 percent by weight of a polyamide resin selected from the group consisting of polycaprolactam, polyhexamethylene adipamide, polyhexamethylene sebacamide, polyhexamethylene isophthalamide, polyhexamethylene tere-co-isophthalamide and mixtures and copolymers of the above;
  (b) from about 5 percent to about 30 percent by weight of a hydroxyl-functional acrylate elastomer containing at least 5 mole equivalents of hydroxyl groups per $10^6$ grams of elastomer prepared by copolymerization of an alkyl acrylate monomer in which the alkyl group contains 1–15 carbon atoms, with a hydroxyl-functional monomer selected from the group consisting of a 2-hydroxyethyl acrylate, 2-hydroxypropyl acrylate, 2-hydroxyethyl methacrylate, 2-hydroxypropyl methacrylate, and allyl alcohol; and
  (c) from about 0.1 to about 10 percent by weight of a styrene/maleic anhydride copolymer having a molecular weight of less than 5000 and an average anhydride content of 2–7 anhydride groups per molecule, wherein the copolymer provides effective coupling of the elastomer to the polyamide.

10. A composition in accordance with claim 9 wherein component (a) is polyhexamethylene adipamide and the hydroxyl-functional monomer of component (b) is 2-hydroxyethyl methacrylate.

11. A composition in accordance with claim 9 wherein component (a) is polyhexamethylene adipamide and the hydroxyl-functional monomer of component (b) is 2-hydroxyethyl acrylate.

12. The process of preparing a high impact-resistant polyamide resin comprising melt-blending from about 50 percent to about 97 percent by weight of a polyamide resin, from about 3 percent to about 50 percent by weight of a hydroxyl-functional elastomer containing at least 5 mole equivalents of hydroxyl groups per $10^6$ grams of elastomer, and from about 0.1 percent to about 10 percent by weight of a succinic-functional coupling agent, wherein the coupling agent provides effective coupling of the elastomer to the polyamide.

13. The process of claim 12 wherein the polyamide resin is selected from the group consisting of polyhexamethylene adipamide, polyhexamethylene sebacamide, polycaprolactam, polyhexamethylene iosphthalamide, polyhexamethylene tere-co-isophthalamide, and mixtures and copolymers of the above.

14. The process of claim 12 wherein the hydroxyl-functional elastomer is selected from the group consisting of hydroxyl-functional poly(ethylene/propylene), poly(ethylene/propylene/diene), polyacrylate, poly(ethylene/acrylate), poly(propylene/acrylate), polyisobutylene and poly(ethylene/vinyl acetate) elastomers, and mixtures of the above.

15. The process of claim 12 wherein the succinic-functional coupling agent is selected from the group consisting of styrene/maleic anhydride copolymers, ethylene/maleic anhydride copolymers, vinyl acetate/maleic anhydride copolymers, vinyl ether/maleic anhydride copolymers, 1-alkene/maleic anhydride copolymers, and mixtures of the above.

16. The process of claim 12 wherein the succinic-functional coupling agent is a styrene/maleic anhydride copolymer.

17. The process of claim 12 wherein the polyamide resin is at from about 70 percent to about 95 percent by weight.

18. The process of claim 12 wherein the hydroxyl-functional elastomer is at from about 5 percent to about 30 percent by weight.

19. A composition suitable for melt-blending into a high impact-resistant molding resin comprising:
  (a) from about 50 percent to about 97 percent by weight of the composition of a polyamide resin;
  (b) from about 3 percent to about 50 percent by weight of the composition of a hydroxyl-functional elastomer containing at least 5 mole equivalents of hydroxyl groups per $10^6$ grams of elastomer; and
  (c) from about 0.1 percent to about 10 percent by weight of a succinic-functional coupling agent, wherein said coupling agent provides effective coupling of the elastomer to the polyamide when melt-blended therewith.

20. The composition of claim 19 wherein the polyamide resin is selected from the group consisting of polyhexamethylene adipamide, polyhexamethylene sebacamide, polycaprolactam, polyhexamethylene isophthalamide, polyhexamethylene tere-co-isophthalamide, and mixtures and copolymers of the above.

21. A composition in accordance with claim 19 wherein the elastomer is selected from the group consisting of hydroxyl-functional poly(ethylene/propylene), poly(ethylene/propylene/diene), polyacrylate, poly(ethylene/acrylate), poly(propylene/acrylate), polyisobutylene, poly(ethylene/vinyl acetate) elastomers and mixtures of the above.

22. A composition in accordance with claim 19 wherein the succinic-functional coupling agent is selected from the group consisting of styrene/maleic anhydride copolymers, ethylene/maleic anhydride copolymers, vinyl acetate/maleic anhydride copolymers, vinyl ether/maleic anhydride copolymers, 1-alkene/maleic anhydride copolymers, and mixtures of the above.

23. The composition of claim 19 wherein the succinic-functional coupling agent is a styrene/maleic anhydride copolymer.

24. The composition of claim 19 wherein the amount of polyamide resin is from about 70 percent to about 95 percent by weight of the composition.

25. The composition of claim 19 wherein the amount of hydroxyl-functional elastomer is from about 5 percent to about 30 percent by weight of the composition.

26. A molded resin product having high impact resistance comprising:
 (a) from about 50 percent to about 97 percent by weight of the product of polyamide units;
 (b) from about 3 percent to about 50 percent by weight of the product of hydroxyl-functional elastomeric units containing at least 5 mole equivalents of hydroxyl groups of residues thereof per $10^6$ grams of elastomer; and
 (c) from about 0.1 percent to about 10 percent by weight of the product of units of a succinic-functional coupling agent, wherein said coupling agent provides effective coupling of the elastomeric units to the polyamide units.

* * * * *